United States Patent [19]

De Pinho Filho et al.

[11] Patent Number: 5,572,182

[45] Date of Patent: Nov. 5, 1996

[54] INTEGRATED POWER AND SIGNAL TRANSMISSION SYSTEM

[75] Inventors: Orlando J. De Pinho Filho; Robert Eisemberg; Orlando de Brito Correia; Ricardo M. Freitas, all of Rio de Janeiro, Brazil

[73] Assignee: Petrolew Brasileiro S.A. - Petrobras, Rio de Janeiro, Brazil

[21] Appl. No.: 197,867

[22] Filed: Feb. 17, 1994

[30] Foreign Application Priority Data

Feb. 17, 1993 [BR] Brazil ..................................... 9300603

[51] Int. Cl.$^6$ ........................................... H04M 11/04
[52] U.S. Cl. ........................ 340/310.02; 340/310.03; 340/3120.04; 340/310.07; 166/250; 307/31
[58] Field of Search ..................... 340/310.02, 310.03, 340/310.07, 310.04, 855.9; 307/31, 149

[56] References Cited

U.S. PATENT DOCUMENTS

| | | | |
|---|---|---|---|
| 3,900,842 | 8/1975 | Calabro et al. | 340/310.03 |
| 3,938,129 | 2/1976 | Smither | 340/310.02 |
| 4,027,286 | 5/1977 | Marosko | 340/310.07 |
| 4,157,535 | 6/1979 | Balkanli | 340/310.07 |
| 4,639,714 | 1/1987 | Crowe | 340/310.02 |
| 4,788,448 | 11/1988 | Crowe | 340/310.03 |

*Primary Examiner*—Brent A. Swarthout
*Assistant Examiner*—Niua Tong
*Attorney, Agent, or Firm*—Sughrue, Mion, Zinn, Macpeak & Seas

[57] ABSTRACT

An Integrated Power and Signal Transmission System A system is described which links by means of a pair of lines the command signals in square waveform from a unit broadcasting such command signals to an operating unit lying a long distance sway so that since the signals are sent at a low voltage of about 36 V and a frequency of about 1 kHz, they are enough after being stored in top quality capacitors to provide power to the operating point at said operating unit, without there being any need to stop power supply when signals are being sent, as used to happen in the previous system. Such system is particularly suitable for the transmiting of operating signals and the receiving of information from a wellhead.

13 Claims, 5 Drawing Sheets

INTEGRATED POWER AND SIGNAL TRANSMISSION SYSTEM

TECHNICAL FIELD

This invention is of a system to transmit power and signals between two points distant from one another, one of them to command and the other to do or to operate whereby the same conductor used to convey power is used to convey the commands for the operating units and to receive answers and information from the operating point. The invention is also a system which makes practically no difference between power and signals transmitted from either of the two points that are apart.

More specifically, this invention can be employed to control and monitor an undersea oil producing plant from a surface station.

BACKGROUND OF THE INVENTION

One of the usual ways of controlling an oil producing plant from the surface has been that of conveying both the power and the signals to operate moving parts (valves, retainers, flow diverters, etc.) along one same pair of wires while trying as much as possible to avoid interference between power and signal lines due to unwanted harmonics.

This practice, however, has its drawbacks, for instance:

a) since the undersea oil producing rigs are being laid in ever deeper waters, power-carrying cables have to travel long distances and therefore resistance becomes greater, which means that relatively high voltages have to be employed (100 to 400 V) and low frequencies (50 to 60 Hz), which is not always desirable because high voltages lead to power leaks along such undersea cables and connectors;

b) signals sent out are usually of low amplitude and high frequency (typical figures being a few mV up to 5 V and 1 to 10 kHz) in order to avoid the appearance of harmonics in the power lines which would affect signals transmitted and make them difficult to read, and which would otherwise call for powerful and efficient filters to separate power from signals, which filters are expensive, bulky and complex and therefore not always as reliable as might be wished.

The conveying of power and signal currents along the same pair of wires but at greatly different frequencies is known as frequency multiplexing.

There is another system that has been worked out whereby power is conveyed in the shape of square waves at typical figures, for instance, of 36 V and 50 Hz and signals are conveyed, for instance, at 3 V and 1 kHz, just one pair of conductors being used for both power and signals. As mentioned, although the voltage applied is low compared with the usual method referred to before, and the square waves used to convey power being very efficient when resistance in the interconnecting cable is very high, this method suffers from the drawback that signal has to be sent when power is turned off, which is referred to as time multiplexing. And, since power must be off when signals are being sent then it must also be off when any answer comes in from the end operating point in reply to the starting point. This latter aspect has not yet been successfully overcome. Also, even though requirements are less it has not been possible to do away with filters.

SUMMARY OF THE INVENTION

The system of this invention as described herein has improvements that do away with many of the drawbacks of the former method, particularly because:

it diminishes the causes of likely interference without the use of filters;

it operates with both power and signals being conveyed by the same conductor (regarded as a more suitable way in an improvement already referred to);

square waves are employed, and;

above all, power does not have to be separated from signals, there being therefore no need for power to be turned off when signals are being sent.

The only obstacle that could not be overcome has been, as referred to before, the fact that power has to be off when the operating point has to communicate with the starting point in order to send an answer to a question. It should be pointed out however that the designers of this system have resorted to the careful selection of a high quality capacitor in order to ensure that the energy stored thereby will be on tap for the operating point to use when its regular source of power is momentarily turned off at the remote initial comanding point.

An idea which is basic to the system invented as well as for later improvements thereof that may arise in the course of research, is that a low voltage current having a frequency of about 1 kHz, which is able to carry a signal sent to the operating point, is enough energy to keep a capacitor continuously charged, that part thereof carrying the signal having been separated out. As referred to before, no difference is made between signals and power, and as has been said as well, there being no need to filter out the signal.

BRIEF DESCRIPTION OF DRAWINGS

The foregoing advantages as well as others will be seen from the following description when read followed with the aid of the attached drawings.

DETAILED DESCRIPTION OF THE PREFERRED EMBODIMENT

Figure 1:
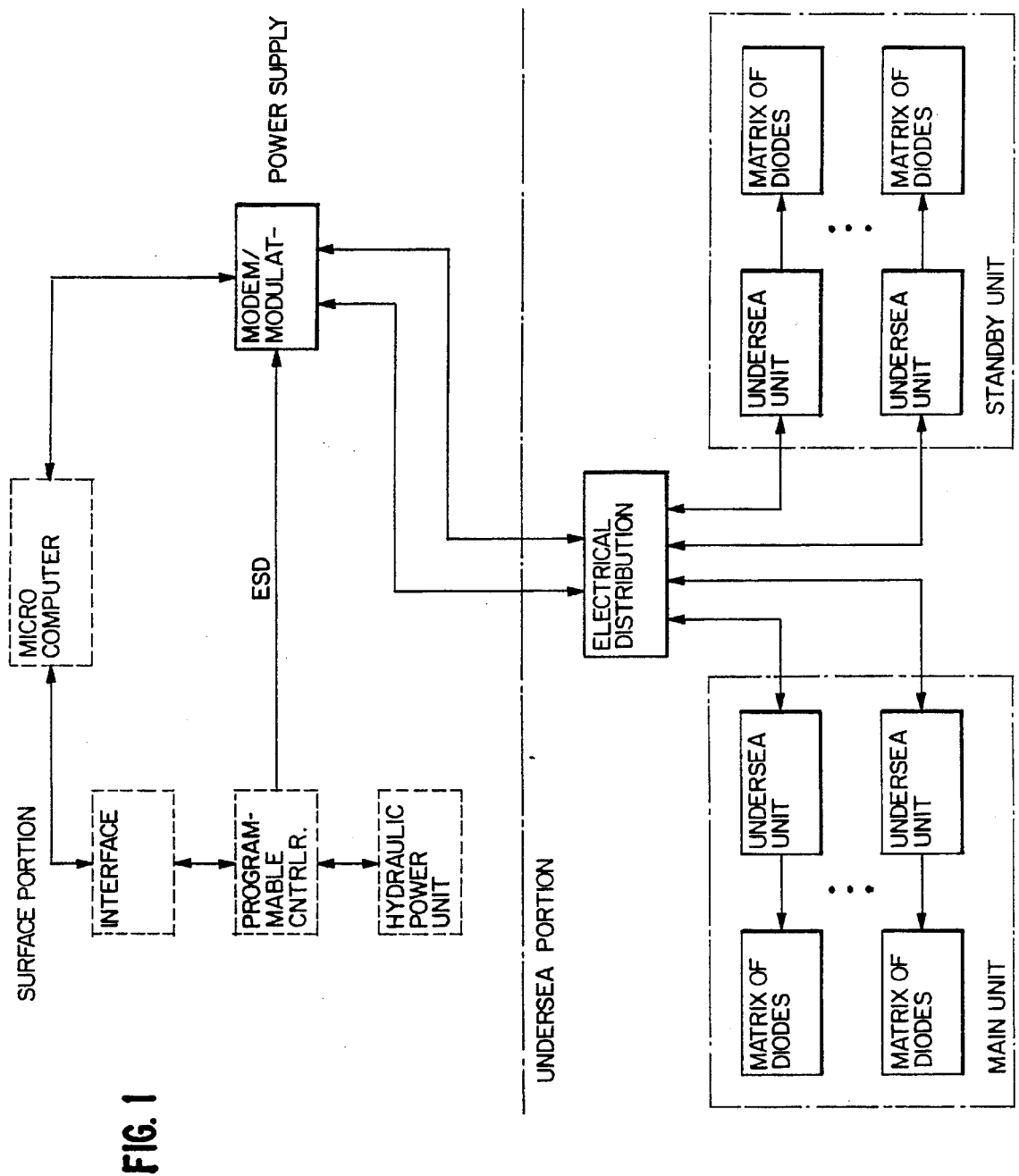
FIG. 1 is a block diagram of the system as a whole and provides an overall view of how the various parts work together.

In the block diagram of FIG. 1 the parts that are not essential for this invention though they are part of information and control system of an undersea oil producing well, are shown within the broken line boxes representing the surface portion of the rig. The essential parts of the invention, whether considered individually or as part of an operating assembly, are named within the full line boxes. A dotted line separates surface from undersea portions. Connecting lines between modem/modulating source and the electrical distribution component may cover a distance as great as the distance between the surface and the undersea units.

The "hydraulic power unit", "programmable controller", "interface" and "micro-computer" components are part of various control assemblies. They should be referred to herein however so that those dealing therewith may be the better able to see how the system herewith invented works. As is to be seen, such components are linked up in series by the signals sent out and manipulated so that such signals arrive at the "modem and modulated source" component (which is here also referred to as the "surface unit" because it encompasses the specific feature of this invention that lies in the surface portion of the system) and from which they will become available to supply power and signals to the undersea components along lengthy cables and directly in communication with the "electric distribution unit" shown in FIG. 1.

Thus the "modem and modulating source" receives the command signal from the micro-computer as well as the safety command to turn off which serves to protect platform plant (ESD).

Figure 2:
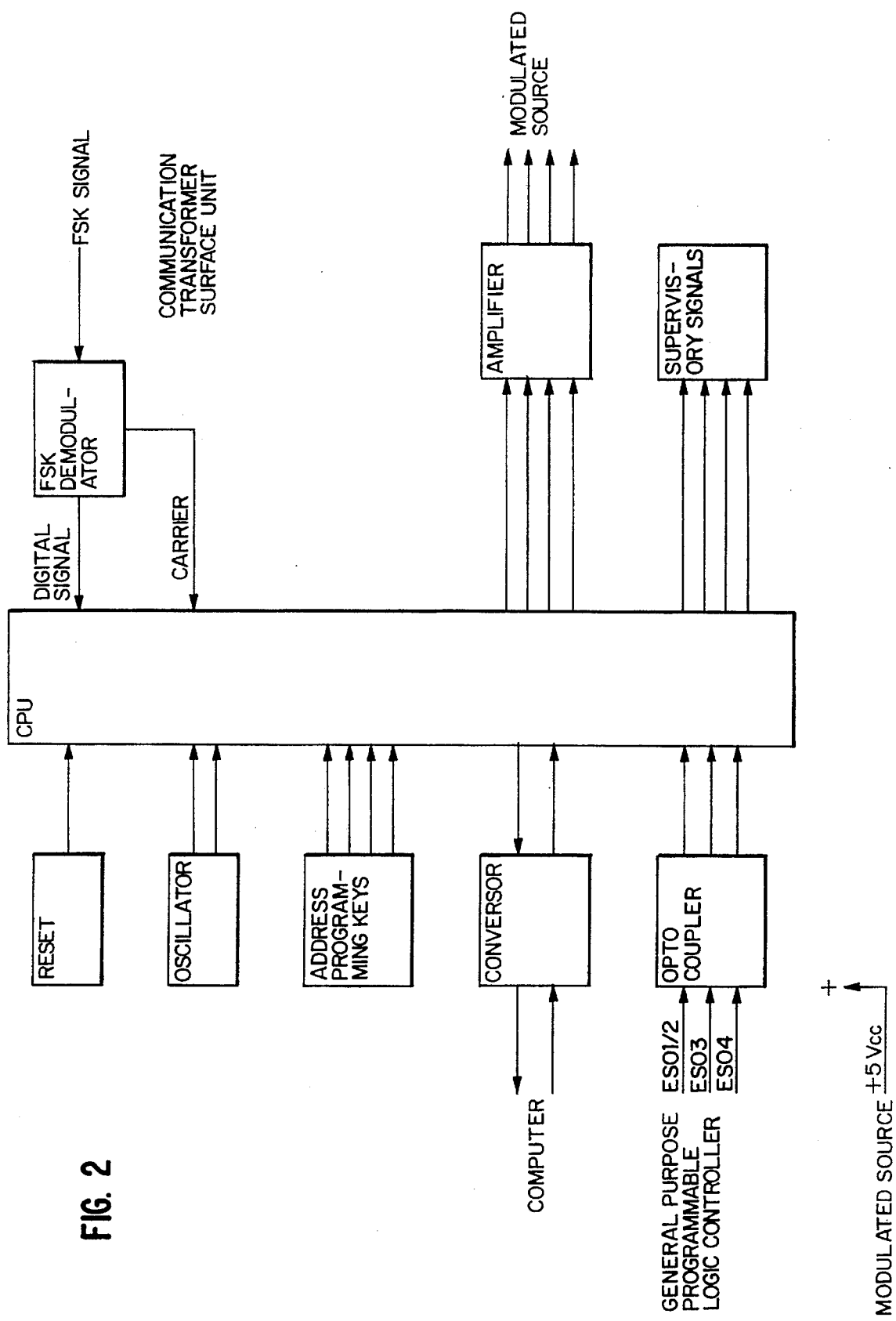
FIG. 2 is a block diagram of modulator-demodulator assembly which modifies messages from units before and outside the system but which are vital in well operation control.

FIG. 2 shows the modulator-demodulator component (MODEM) of the modem and modulating source. As can be seen, the most important central part of the MODEM is a CPU that receives communications on the various parameters, and in addition to its task of signalling referred to in the last block at the right, amplifies signals and sends them to the modulated source.

Figure 3:
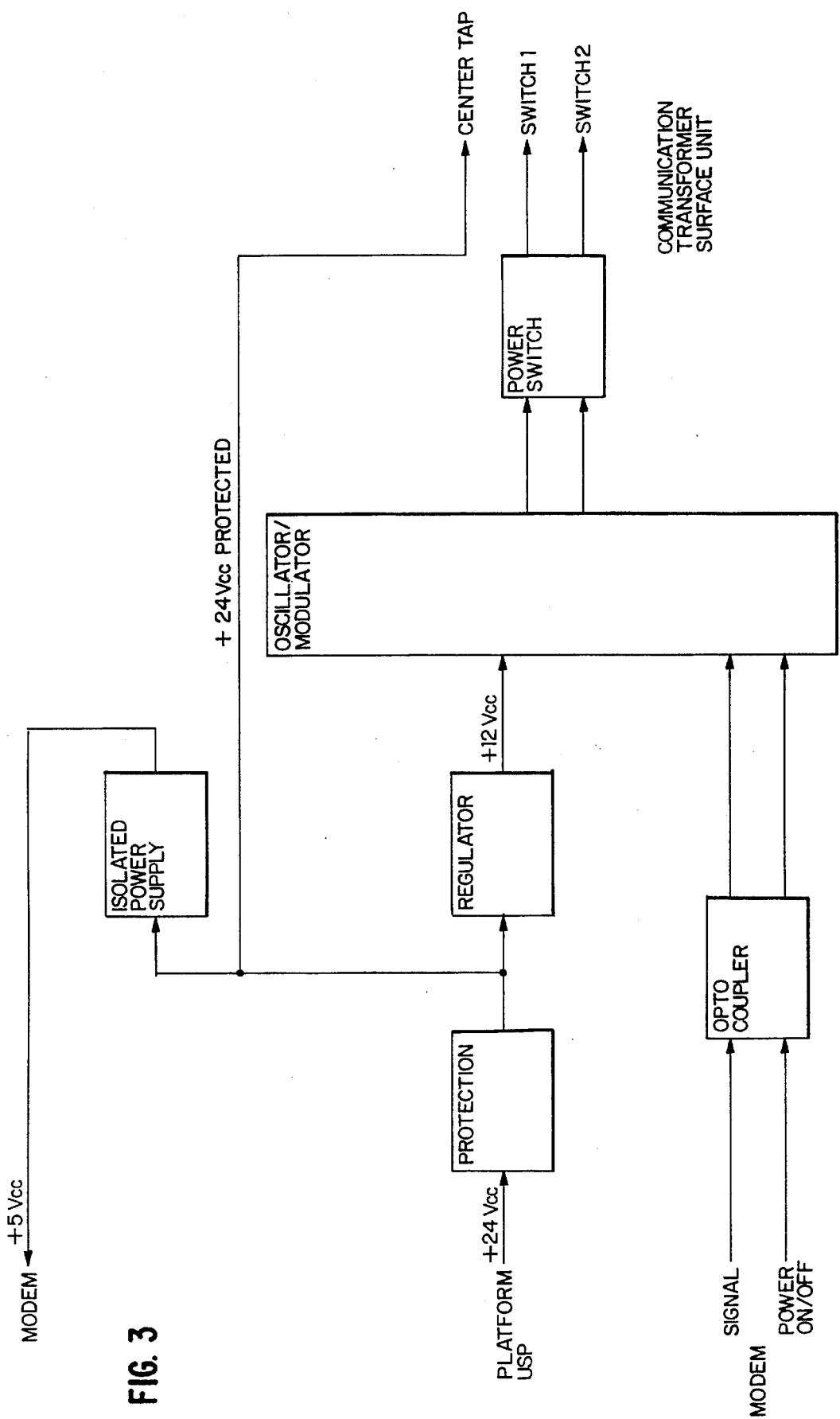
FIG. 3 is a block diagram (also considerably simplified as in FIG. 2) showing how the source suitably modulates signals before sending them out to the electrical distribution unit shown in one of the blocks of FIG. 1.

The block diagram in FIG. 3 is a simplified sketch of the modulator of the modem and modulating source, how signals from the MODEM are treated, of how they are modulated by the "oscillator-modulator" unit, and also of how the no-break current from the platform is modulated. Signals from the oscillator-modulator are sent to the switcher which communicates with the undersea portion.

In the undersea portion signals (power and command signals sent from the surface) are received directly by the electric distribution unit and sent by it to the "undersea unit" which will be explained in detail in another though not limiting example in FIG. 4.

Figure 4:
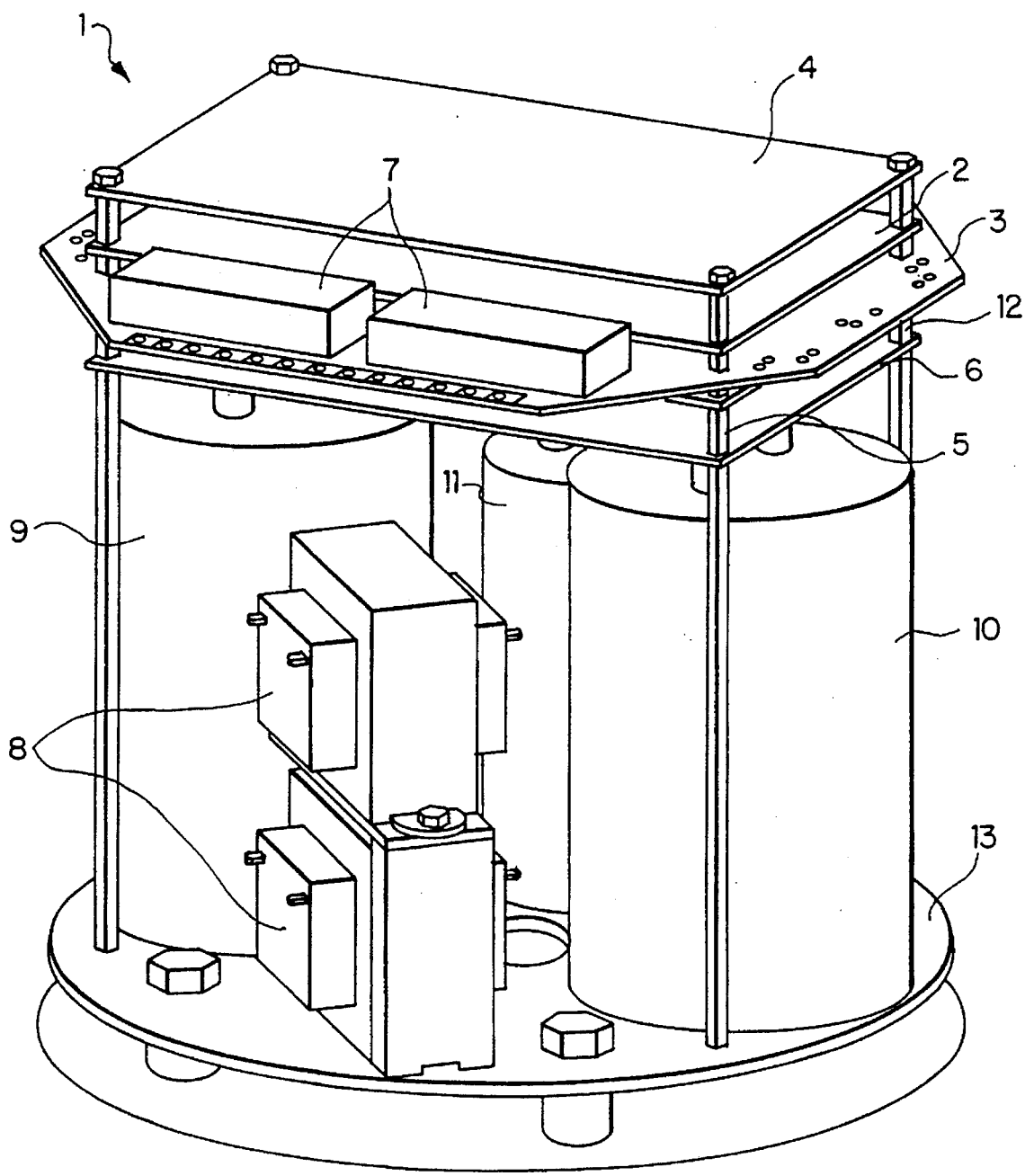
FIG. 4 is a plan of a version (given as an example only) of the undersea part of the current system meant to show how certain components in the diagram of FIG. 1 operate.

Just one practical assembly is shown in FIG. 4 one which can be easily installed and which is provided with the various features that can make installation of said undersea unit an easier task. It must be pointed out however that the following description is merely meant to provide a better idea to those engaged in such kind of work, though this does not signify that the shapes and the arrangements shown should be regarded as the only ones.

In FIG. 4 the arrangement set up is given the number 1, and consists of a framework on a single support, a practical kind of construction that makes it functional. Supporting columns stand on a supporting base 13, to which they are fixed at some suitable point below the surface (not shown). Five boards 2, 3, 4, 5 and 6 overlie one another, with a space between one another, and are fastened at their corners. Also resting upon and suitably fastened to the base 13, there are three electrolytic capacitors 9, 10 and 11, lying apart from one another. Likewise lying upon said base 13, there are two transformers 8. The five boards 2, 3, 4, 5 and 6, shown overlying one another, are meant to bear electronic circuits the function whereof will be explained further on herein. The three capacitors 9, 10 and 11 operate in a given system but only capacitor 9, operates in the arrangement described herein, number 10 being a standby for number 9. The third capacitor 11, meant to store up energy for the task of transmitting the pressure and temperature control signal (DPTT), where employed. Also, of the two transformers B, shown, only one operates, the other being its standby. The same applies to the electric distribution units, or sources 7, lying upon board 3. Wiring has been left out since it is not essential in understanding the invention, and also not to impede a proper view of components, since those engaged in this kind of work can easily understand where wiring should lie. Board 4 is the interface which may be used to bear the well temperature and pressure transmitter (DPTT), which if used is inserted into the system. If this interface is used with the DPTT signal transmitter the board will be connected to processing board 2, which carries the main electronics of the system. If DPTT transmitter is not used, board 4 will be a blind board merely acting to shield the electronic assembly.

Below main electronics board 2 (also referred to herein as the CPU board) lies base board 3, meant to act as a reference point for electrical connections within arrangement 1, and as support for sources 7, as already mentioned. Since this board merely serves as a means of physically supporting connecting devices, there is no need to describe it in any detail.

Board 5 which lies below base board 3, is a board that carries electronics as does board 2, and it is here referred to, just for the sake of distrinction, as the "redundant CPU board".

Board 6 merely acts as a shield for the four boards lying above it, to protect the capacitors: physical and electrical distance apart.

As already mentioned, electrical connections are made taking base board 3, as a reference point and intermediate means of support, while signals are sent out to the various parts controlled from the well by means of a matrix of diodes which controls traffic thereof. Such matrix of diodes is sketched in merely as a block in FIG. 1.

However, as was found in the course of building this system, the diodes that make up such matrix of diodes for communicating with the well head (see FIG. 1) if provided with stronger that usual capsules (for instance, glass covered) need not lie within the protected housing of the device shown in FIG. 4, referred to as the "undersea unit", for they can even lie in an outside assembly under great pressure. This means that less space is taken up in assembling said "undersea unit" and that wiring becomes simpler.

In the system concerned it is expected to employ input voltages of 36 to 100 V, though in actual practice such figures are reasonably low, because: low voltage signals (close to 36 V) are usually enough for signal sent to be reasonably strong, and to become stronger at capacitors 9, 10 and 11 so that the operating of units governed by the well head are not stopped when power is cut off because an answer has to be received from well head units (which used to happen in the previous of doing things); and also because control signals sent from surface to undersea part is done on square waves and at frequencies close to 1 kHz (more precisely, 1070 Hz and 1270 Hz, which are the transmitting signales for "one" and "zero" digital signals in the FSK system at 300 bps).

It should be noted that the modem in such instances, because its electronic arrangement covers treatment by a signal processing unit (see FIG. 2) and does not just merely modulate and demodulate, becomes an intelligent unit. In actual fact the modem also acts as a temporizer, so as to delay return communication concerning data requested from a well head, and it also becomes a converter of protocol in order to provide instructions on how to operate well head devices, thereby acting as an interface between the end part of the system and the overall control computer.

In addition to the features described above the modem acts as a means of conveyance regardless of the actual system of control, for emergency signals from platform and well, which travel freely, if required, giving out warning signals.

Figure 5:
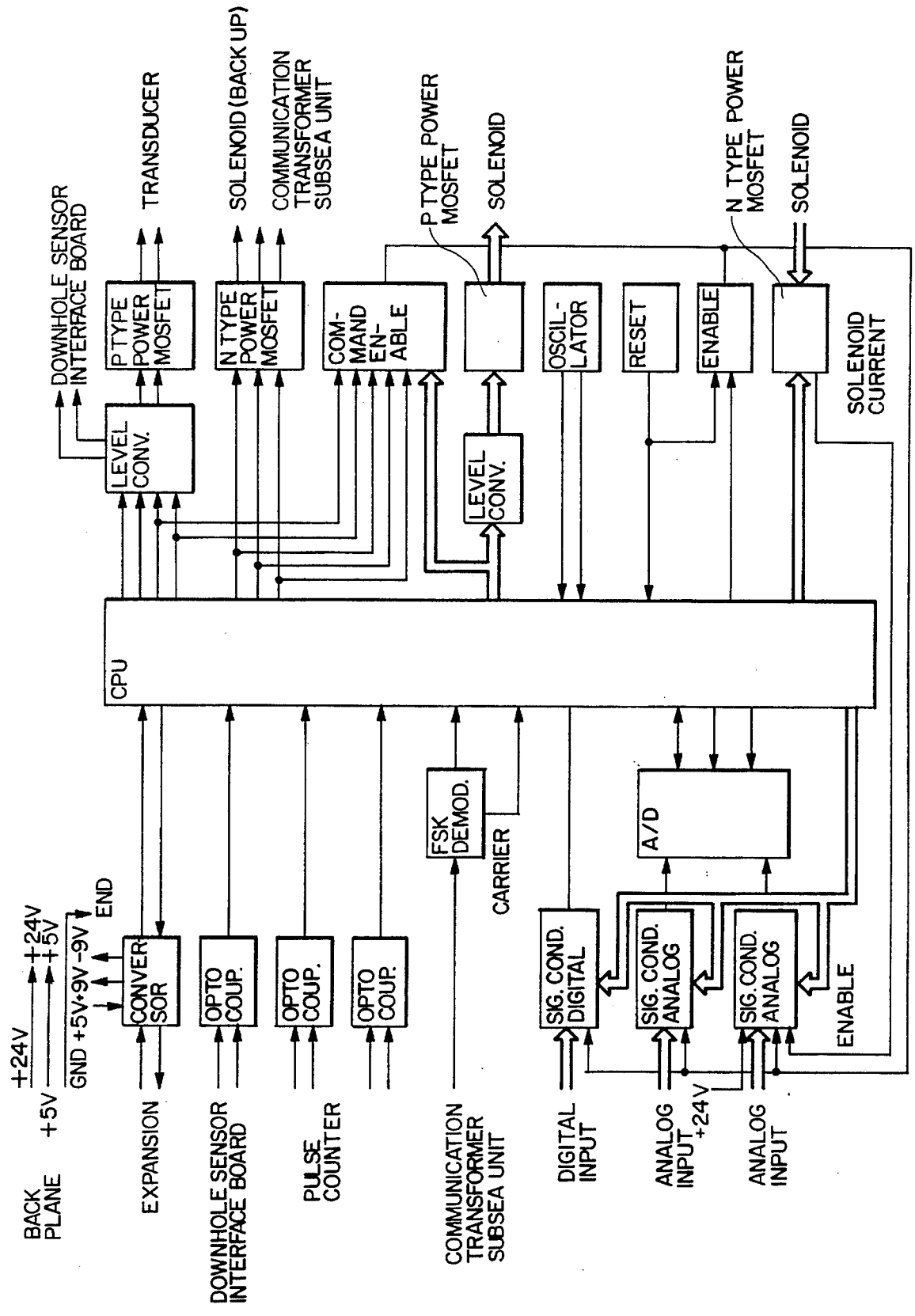
FIG. 5 is a block diagram of the major unit (CPU board) of the intelligent system that deals with data from various points of the system meant to be sent to the well to carry out the tasks ordered which at the same time receives answers sent by the operating or measuring point for treatment and forwarding by the surface control unit.

As a matter of fact, owing to the treatment afforded to signals at various stages of the system in the surface portion thereof, as well as in the undersea portion, where there are processing units (CPU), the system may be called a "distributed intelligence" system, which makes it a system able to deal with all control occurrences without any communication difficulty (see FIG. 5).

It can thus be seen that in view of the features described above, particularly as regards making communication less complicated through use of simpler means, such as use of just one relatively low voltage and a quite specific high frequency, from which the command signal itself is picked, and by cutting the risk of breakdown because highly reliable components are chosen and used, chiefly the capacitors, the integrated system for the transmission of power and signals as described above has more advantages than the system previously employed, which makes it particularly useful in the remote control of an operating unit from a remote monitoring unit, particularly if said monitoring unit is on a processing platform and the unit controlled is a well in an oil field at the bottom of the sea consisting of many wells. It must also be understood that the embodiment described as an example is merely meant to provide a clearer understanding of the invention, and is in no way limiting, limitations being expressed only in the claims made below.

We claim:

1. An integrated power and signal transmission system, which joins a signal control and emission station containing a hydraulic power unit, a programmable controller, and a microcomputer, to a remote operating station that receives control signals so that the control signals sent out by the signal control and emission station reach operating points which are connected to and controlled by the remote operating station and at the same time sends information back to said signal control and emission station, when necessary, wherein said integrated power and signal transmission system includes a surface unit, comprising a modem and a modulated source, which directly receives said control signals broadcast by the signal control and emission station, which converts said control signals to modified signals, and which communicates with an electric distribution unit, wherein said electric distribution unit is directly connected to an electronic unit which is enclosed in a housing and which comprises:

a) boards containing electronic components to manipulate said modified signals;

b) at least one transformer;

c) at least one electronic distribution unit; and d) at least one capacitor;

wherein said boards, said at least one transformer, said at least one electronic distribution unit, and said at least one capacitor are electrically connected together, wherein said electronic unit receives said modified signals from said surface unit and sends said modified signals to the operating points, wherein said modified signals output from said surface unit have voltage levels substantially in a range of 36 V to 100 V and have frequencies substantially in a range of 0.9 kHz to 1.1 kHz, wherein said modified signals have a substantially square waveform, and wherein said modified signals are transmitted from said surface unit to said remote operating station along a single pair of conductors, so as to provide power and operating signals to operate the remote operating station.

2. The integrated power and signal transmission system as in claim 1, wherein said voltage levels and said frequencies of said modified signals output by said surface unit to the remote operating station are substantially 36 V and substantially 1070 Hz and 1270 Hz, respectively.

3. The integrated power and signal transmission system as in claim 2, wherein the control and emission station lies on an offshore oil producing platform and the operating station lies next to an operating assembly or a parameter reading unit which parameters are read at a wellhead lying at the bottom of the sea.

4. The integrated power and signal transmission system as in claim 3, wherein said boards with said electronic components are arranged over one another at a given distance away from one another so as to avoid any physical contact among them.

5. The integrated power and signal transmission system as in claim 4, wherein one of said boards lies further down in the overlying arrangement and is a blind board used merely for shielding purposes, wherein an uppermost board of said boards in said overlying arrangement comprises a circuit for transmitting pressure and temperature signals relating to temperatures and pressures surrounding said remote operating station or said operating points or is a blind board used merely for shielding purposes.

6. The integrated power and signal transmission system as in claim 2, wherein said boards with said electronic components are arranged over one another at a given distance away from one another so as to avoid any physical contact among them.

7. The integrated power and signal transmission system as in claim 6, wherein one of said boards lies further down in the overlying arrangement and is a blind board used merely for shielding purposes, wherein an uppermost board of said boards in said overlying arrangement comprises a circuit for transmitting pressure and temperature signals relating to temperatures and pressures surrounding said remote operating station or said operating points or is a blind board used merely for shielding purposes.

8. The integrated power and signal transmission system as in claim 2, wherein said at least one capacitor stores energy contained within said modified signals transmitted from said surface unit such that said at least one capacitor supplies power to said electronic unit when electronic unit initiates transmission to send said information back to said signal control and emission station.

9. The integrated power and signal transmission system as in claim 1, wherein the control and emission station lies on an offshore oil producing platform and the operating station lies next to an operating assembly or a parameter reading unit which parameters are read at a wellhead lying at the bottom of the sea.

10. The integrated power and signal transmission system as in claim 9, wherein said at least one capacitor stores energy contained within said modified signals transmitted from said surface unit such that said at least one capacitor supplies power to said electronic unit when electronic unit initiates transmission to send said information back to said signal control and emission station.

11. The integrated power and signal transmission system as in claim 1, wherein said boards with said electronic components are arranged over one another at a given distance away from one another so as to avoid any physical contact among them.

12. The integrated power and signal transmission system as in claim 11, wherein one of said boards lies further down in the overlying arrangement and is a blind board used merely for shielding purposes, wherein an uppermost board of said boards in said overlying arrangement comprises a circuit for transmitting pressure and temperature signals relating to temperatures and pressures surrounding said remote operating station or said operating points or is a blind board used merely for shielding purposes.

13. The integrated power and signal transmission system as in claim 1, wherein said at least one capacitor stores energy contained within said modified signals transmitted from said surface unit such that said at least one capacitor supplies power to said electronic unit when electronic unit initiates transmission to send said information back to said signal control and emission station.

* * * * *